United States Patent
Rai et al.

(10) Patent No.: US 7,051,328 B2
(45) Date of Patent: May 23, 2006

(54) PRODUCTION SERVER ARCHITECTURE AND METHODS FOR AUTOMATED CONTROL OF PRODUCTION DOCUMENT MANAGEMENT

(75) Inventors: Sudhendu Rai, Fairport, NY (US); Daniel Viassolo, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 785 days.

(21) Appl. No.: 09/772,118

(22) Filed: Jan. 26, 2001

(65) Prior Publication Data

US 2002/0129081 A1    Sep. 12, 2002

(51) Int. Cl.
*G06F 9/46* (2006.01)
(52) U.S. Cl. .................. 718/102; 718/100
(58) Field of Classification Search ............ 718/1–108; 709/200–253
See application file for complete search history.

(56) References Cited

U.S. PATENT DOCUMENTS

| | | | | |
|---|---|---|---|---|
| 3,831,197 A | * | 8/1974 | Beach et al. .................. 360/71 |
| 5,918,988 A | * | 7/1999 | H.A.M. Van Oijen ........ 400/76 |
| 6,166,822 A | * | 12/2000 | Harrington et al. ........ 358/1.13 |
| 6,272,483 B1 | * | 8/2001 | Joslin et al. .................. 706/62 |
| 6,474,881 B1 | * | 11/2002 | Wanda ........................ 400/61 |
| 6,728,947 B1 | | 4/2004 | Bengston |
| 2002/0071134 A1 | | 6/2002 | Jackson et al. |
| 2002/0124756 A1 | | 9/2002 | Rai et al. |

OTHER PUBLICATIONS

John Gregory, "Linear Programming FAQ", Google Groups, Newsgroups: news.answers, sci.answers, sci.op-research, Dec. 9, 1993.*

* cited by examiner

*Primary Examiner*—Meng-Al T. An
*Assistant Examiner*—Kenneth Tang
(74) *Attorney, Agent, or Firm*—Fay, Sharpe, Fagan, Minnich & McKee, LLP

(57) ABSTRACT

A printing workflow system is utilized for coordinating production of document processing jobs among a plurality of cells, where a cell is comprised of at least one device for completing the jobs. The present invention describes the architecture of such a system, and efficient methods for generating document processing job IDs and two methods for routing and scheduling document processing jobs through the cells.

24 Claims, 12 Drawing Sheets

FIG. 2
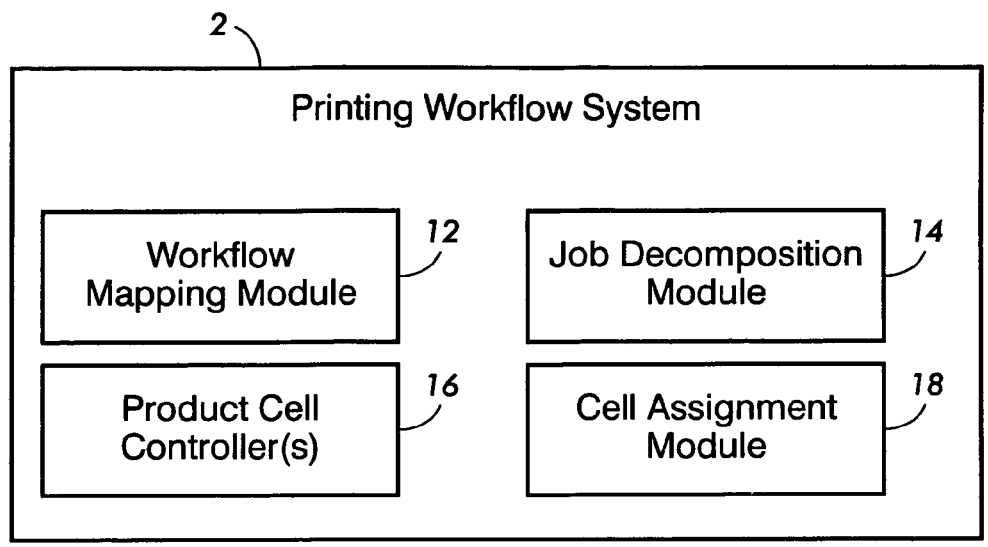
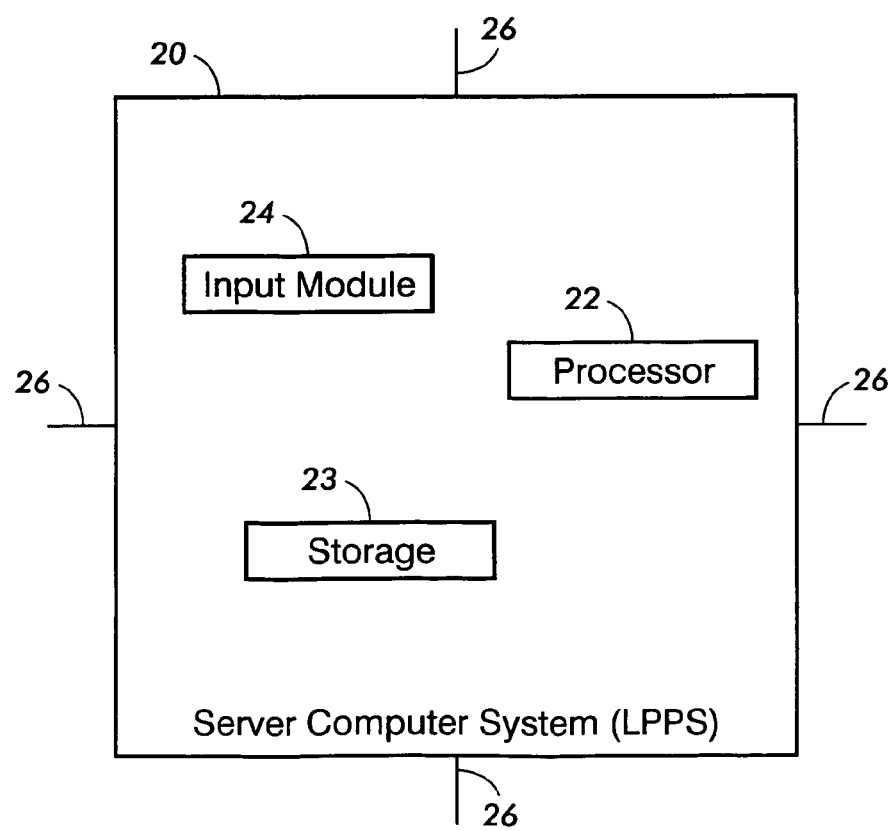
FIG. 3

FIG. 5
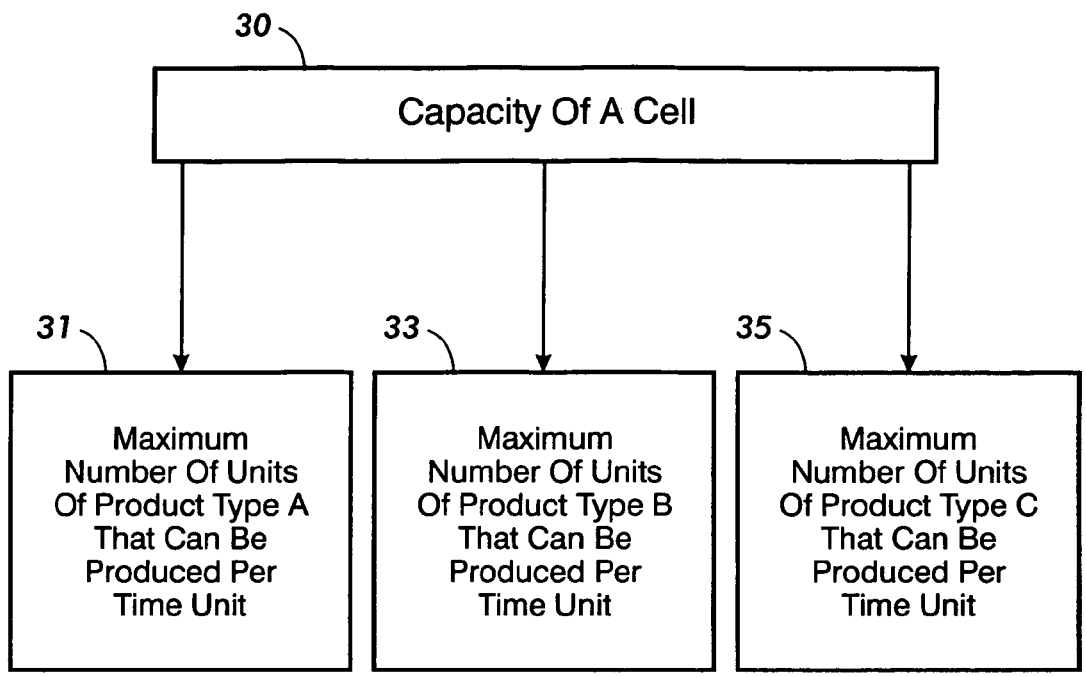
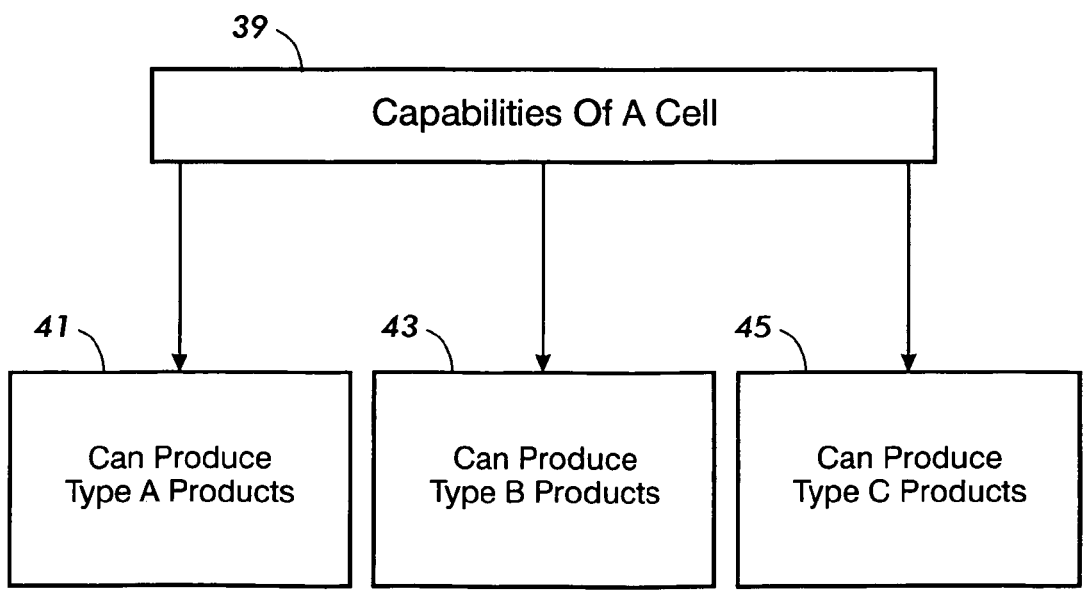
FIG. 6

PRODUCTION SERVER ARCHITECTURE AND METHODS FOR AUTOMATED CONTROL OF PRODUCTION DOCUMENT MANAGEMENT

FIELD OF THE INVENTION

The present invention relates generally to a document production server and more particularly to coordinating production of document processing jobs in a print shop.

BACKGROUND OF THE INVENTION

Conventional print shops are organized in a manner that is functionally independent of the print jobs, the print job mix, and the total volume of print jobs passing through the system. Most commonly, equipment that is somewhat related is grouped together on a factory floor. This causes all printing equipment to be grouped in a single locale and for example, all finishing equipment to be grouped in a separate locale. In other words, conventional print shops typically organize resources into separate departments, each department corresponding to a particular process that is performed in completing a print job.

When a print job arrives at a conventional print shop, the print job sequentially passes through each department. Once the print job is completely processed by a first department, the print job is placed in queue for the next department. The queue is sometimes in the form of a temporary storage facility. This process continues until the print job makes its way through each department and is completed.

There are a number of limitations with conventional print shops. For example, the equipment employed in conventional print shops is not well interfaced with internal computer systems. In addition, the equipment is often physically organized in an inefficient arrangement. Typical arrangements employ machines that require operators to load/unload jobs, monitor job progress, pass jobs on to a next station, and commence a next job. In between each of the steps, each job is commonly stored in a storage area awaiting the next step of the job. As a result, excess inventories may buildup and add to the costs of the job. A physical job card is used to track progress of a job. The job card specifies the steps needed to be completed to finish the job. The job card also specifies the steps already completed, and the order in which steps are to be performed. The data regarding job completion is manually added to the job card, or sometimes is only remembered by the operators working on the job. The lack of real time information concerning the contemporaneous state of the machines and the jobs leads to less efficient plant utilization, and lower productivity. Further, large jobs cannot easily be split into more efficient smaller job lots due to the difficulty in tracking the smaller job lots.

SUMMARY OF THE INVENTION

For the foregoing reasons, there exists in the art a need for a more efficient strategy to producing print jobs. The present invention provides a solution to the above-described problems by providing a system and method for coordinating production of document processing jobs among a plurality of autonomous cells. A "cell" comprises at least one device for completing the document processing jobs.

In accordance with one example embodiment of the present invention, a printing workflow system is disposed in a network for coordinating production of document processing jobs. The printing workflow system is comprised of a plurality of cells, where each cell is comprised of at least one device for completing the document processing jobs.

The printing workflow system may include a search module for searching which one of the cells can execute the document processing job and creating a first subset of cells available to process the document processing job. The printing workflow system additionally includes a transfer module for transferring information to the first subset of cells about the document-processing job. Also, the printing workflow system further includes a receiver module for receiving bids in response to the information transferred to the first subset of cells to process the document-processing job. The printing workflow system has a selector module for selecting cells to process the document-processing job based on information in the bids received. The printing workflow system has a queuing module for dispatching jobs to cells.

In accordance with an additional aspect of the present invention, a scheduling device is provided for scheduling a document-processing job in a printing workflow system. The scheduling device includes a first and second module for determining whether the document processing job in a printing workflow system can be processed by one or by a plurality of cells, and determining the time it would take to process the document processing job in the first module. The scheduling device includes a third module for determining timing parameters to accomplish the document-processing job based on the information in the second module. The scheduling device includes a fourth module for applying the timing parameters to the cell or plurality of cells to process the document processing job by a specified due date. Also, the scheduling device includes a fifth module for queuing the document processing job in one or more cells based on the information from the fourth module to efficiently process the document processing job by the specified due date.

In accordance with an additional aspect of the present invention, a device is provided for assigning a unique ID to a document-processing job. The device includes a matrix for defining operations performed by a printing workflow system wherein a new operation in the printing workflow system is prepended to the matrix. The device includes a descriptor module for creating a new matrix by assigning a value in the matrix for each operation required to be performed by the document-processing job. The device includes a converter module for converting the new matrix into a numerical format that represents the unique ID.

In accordance with an additional aspect of the present invention, a device is provided for assigning a descriptive ID to a document-processing job. The device includes a unique ID for identifying uniquely the document-processing job. The device includes a first module for appending a due date of the document-processing job. The device includes a second module for appending a due time of the document-processing job to the unique ID. The device includes a third module for appending the number of duplicates needed for the document-processing job to the unique ID. The device includes a fourth module for appending to the unique ID a number of units associated with each operation in the document processing job. The device includes a fifth module for creating the descriptive ID by appending the information in the first module, second module, third module, and fourth module into a string.

BRIEF DESCRIPTION OF THE DRAWINGS

The aforementioned features and advantages, and other features and aspects of the present invention, will become understood with regard to the following description and accompanying drawings; wherein:

FIG. 2 is a diagrammatic illustration of software components employed in the printing workflow system of FIG. 1.

FIG. 3 is an illustration of a server 20 employed in the printing workflow system.

FIG. 5 is an illustration of a capacity of a cell.

FIG. 6 is an illustration of capabilities of a cell.

DETAILED DESCRIPTION OF THE INVENTION

Figure 1:
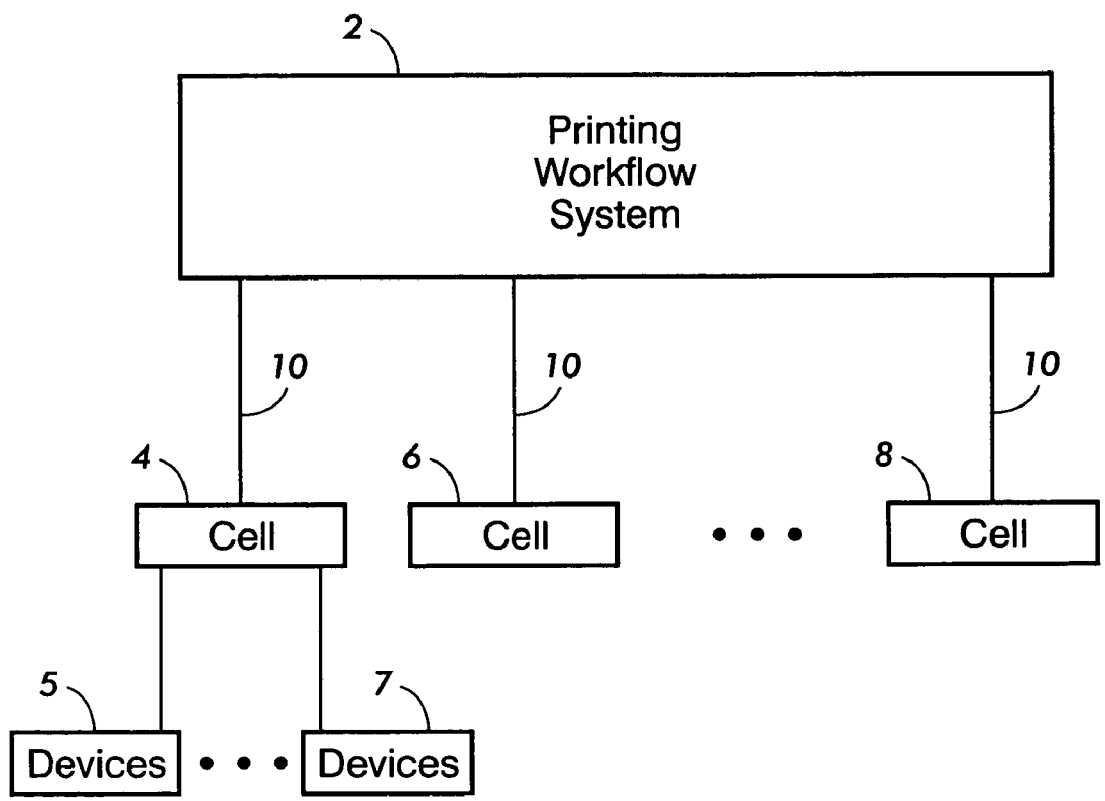
FIG. 1 is a diagrammatic illustration of a printing workflow system in combination with cells and their corresponding devices according to one aspect of the present invention.

The illustrative embodiment of the present invention provides a lean production process server (LPPS) for coordinating production of document processing jobs in a document factory (such as a print shop). The server exploits lean production techniques to control document processing jobs. The server can be run on a number of different platforms, including but not limited to UNIX, Windows or Window NT based-platform, such as a server computer system. The server determines workflow priorities and manages workflow accordingly. Those skilled in the art will appreciate that the present invention may also be practiced with platforms that run other varieties of operating systems. Moreover, the server need not run on a dedicated computer system but rather may run on another variety of electronic device, such as a printer, copier, etc. Workflow priorities for document processing jobs can be determined by observing the various jobs processing units.

The illustrative embodiment presumes that the document factory has been partitioned into autonomous cells. Each cell is a logical grouping of resources (including both equipment and manpower) in the document factory that is sufficient for completing at least one type of document processing job. Thus, a first cell may include a printer and binder whereas a second cell may include a copier and a collator. The LPPS is responsible for distributing document processing jobs in such cells in an efficient manner (as will be described in more detail below).

Referring now in detail to the drawings, wherein the parts are designated by the reference numerals throughout, FIGS. 1 through 15 are an illustrative embodiment of a printing workflow system and a method for assigning sub-jobs to various cells in the printing workflow system or according to the present invention. Although the present invention will be described with reference to the example embodiments illustrated in the figures, it should be understood that the present invention could be embodied in many alternative forms.

FIG. 1 illustrates a printing workflow system 2 in a print shop (i.e., a document factory). The printing workflow system 2 controls a multitude of cells 4, 6, 8. The printing workflow system 2 sends information to and receives information from the cells 4, 6, 8 via the communication links 10. The cells 4, 6, 8 are comprised of at least one device 5 for assisting in completing a document processing job of given product-types. For example, printing device 5 can be a laser printer 600 dpi and printing device 7 can be a color printer 1200 dpi.

FIG. 2 illustrates several of the software modules employed in the printing workflow system 2. The printing workflow system 2 includes a workflow mapping module 12 that determines the workflow for selected document processing jobs. As will be described in more detail below, the workflow identifies the operational steps needed to complete a document processing job. The workflow also identifies the sequence of these operational steps. A job decomposition module 14 is included for splitting the document processing jobs into sub-jobs and for sending the sub-jobs to cells for completion. A product cell controller (PCC) 16 may be provided at given cells for receiving at least one sub-job to further split the sub-job to be processed by a printing device in the cell. Lastly, a cell assignment module 18 is provided for assigning sub-jobs to be processed by a cell.

In general, a print job is received and a workflow for it is developed by the workflow mapping module 12. The job decomposition module may split the job into sub-jobs. The sub-jobs or job are then assigned to cells for completion by the cell assignment module 18. The sub-jobs may be sent to product cell controller 16 of the assigned cells, where each sub-job may be further sub divided.

FIG. 3 illustrates a server computer system 20 (i.e., LPPS) which is suitable for use in the printing workflow system 2. The server 20 includes a processor 22, a storage 23, communication links 26, and an input module 24. The input module 24 is used to receive input from various devices via the communications links 26. The input module 24 receives the document processing jobs on behalf of the server 20. The processor 22 executes the programming instructions on the server 20 to manage document processing jobs. The server 20 stores the instructions in the storage 23. For example, modules 12, 14, and 18 and other data are stored in storage 23. Module 16 may be executed on a separate server that is particular to a cell.

Figure 4:
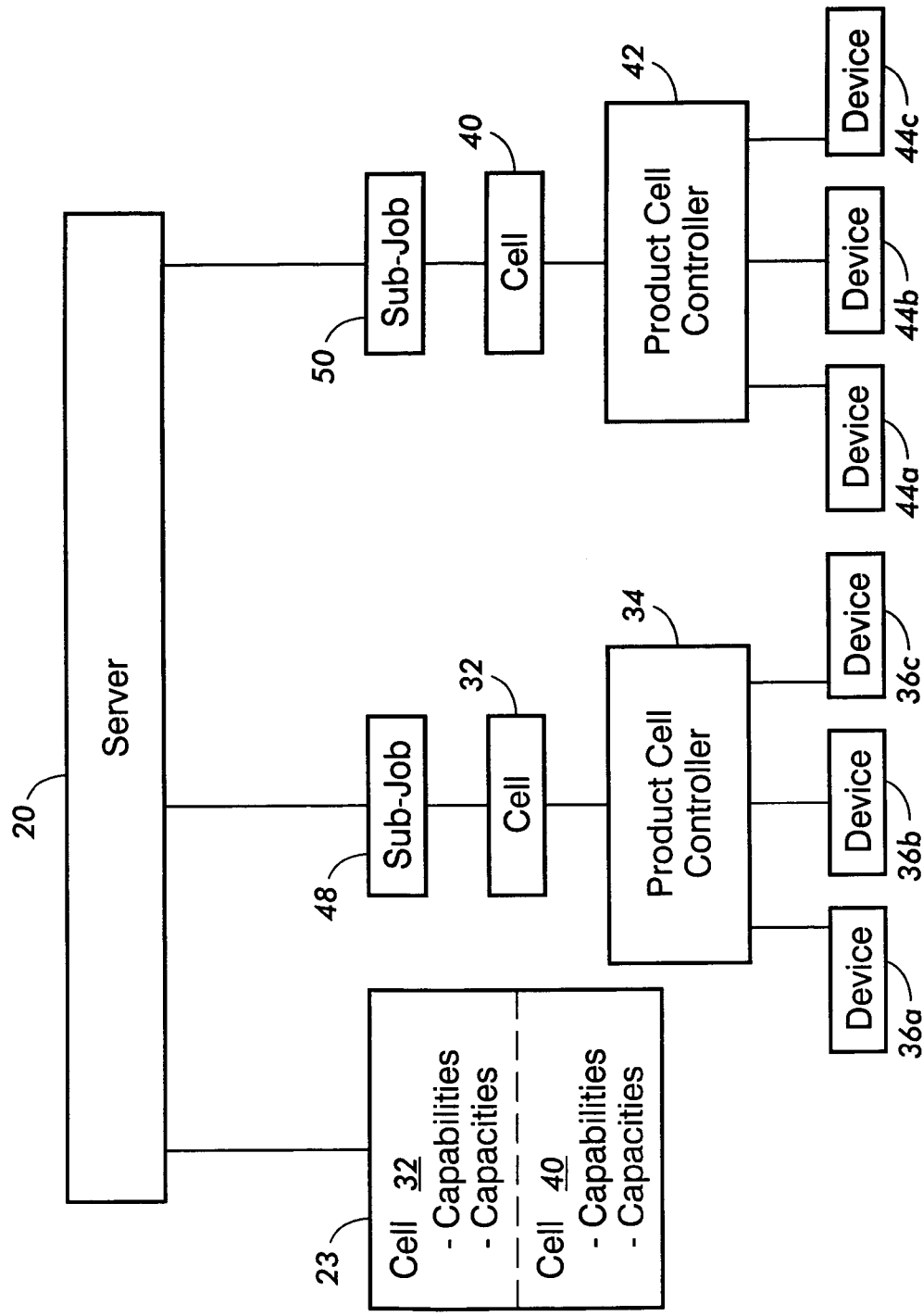
FIG. 4 illustrates the splitting of a document processing job into sub-jobs in the illustrative embodiment.

FIG. 4 illustrates the printing workflow system 2 interacting with a cell in a network provided in a print server. The product cell controller 34 for the cell receives a sub-job 48 from the server 20 to be further processed by the cell. The server 20 stores in its storage 23 the capacities and capabilities of each cell in the print shop to produce different product-types. For example, cell 32 in the network produces three different types of documents and cell 40 produces two types of documents. (It is quite possible that two different cells can produce similar, or even the same, document types. A document type is uniquely characterized by the sequence of processing steps to completely finish the document). The server 20 stores this information to determine which cell has the capabilities to process a document job. The printing workflow system 23 also stores the capacity of each cell to determine the volume of a particular product-type that a cell can produce. As stated above, the job decomposition module 14 splits a document processing job into sub-jobs to be sent to various autonomous cells for processing. The cells in the network are autonomous and can produce their respective product entirely by themselves. Thus, in the example shown in FIG. 4, a document processing job is split into sub-jobs 48 and 50 that are sent to cells 32 and 40, respectively. The product cell controllers 34 and 42 send the sub-jobs 48 and 50 to devices 36a, 36b, 36c and 44a, 44b, 44c in the respective cells 32 and 40 for processing.

FIG. 5 illustrates an example of how capacity is defined for a cell in the illustrative embodiment. As stated above, the printing workflow system 2 stores the capacity of each cell. "Capacity" is the maximum volume of a particular product type that the cell can produce for a time period. For example, FIG. 5 shows capacities for 31, 33, and 35 three different product types (Product A, Product B, and Product C). The printing workflow system 2 updates the capacities and makes it easier to determine which cells should be assigned a sub-job. Capabilities are used to determine the assignment for a cell to process a sub-job.

FIG. 6 shows an example of the capabilities 39 stored for a cell 32. Cell 32 is capable of processing various document product-types A, B, C. Hence, capabilities 41, 43, and 45 are stored for cell 32. For example, if a user has a document of product-type D, then cell 32 would not be the choice to accomplish the processing of the document because the cell 32 does not support such a capability. The printing workflow system 2, stores the capabilities for each cell in the print shop. This allows the cell assignment module 18 to examine the capacities and capabilities of the cells to determine which cell to assign a particular sub-job.

Figure 7:
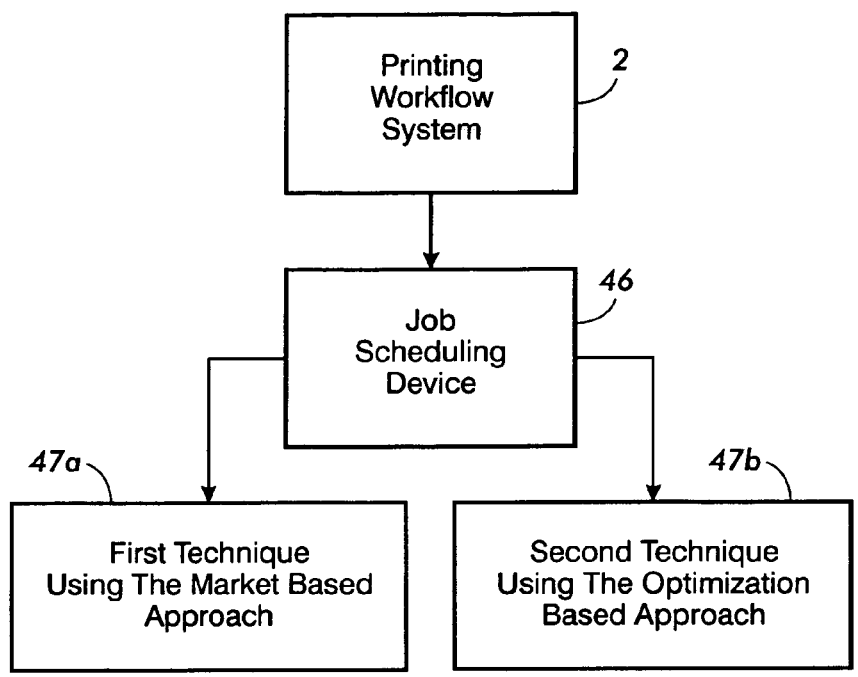
FIG. 7 is an illustration of the job scheduling device.

FIG. 7 illustrates a flow diagram of the inventive job scheduling system. Once a document processing job is prepared for processing, the job scheduling system 46 determines the best method for scheduling the document processing job. The present invention provides two techniques for routing and scheduling document processing jobs. The first technique 47a is the market-based approach of scheduling a document processing job. The second technique is an optimization method.

The first technique 47a for scheduling a document processing job is based on an arrangement wherein a document factory have autonomous cells that do not necessarily share their internal operational characteristics with each other. Operational characteristics such as cell capacities, cell capabilities, and slack times are not necessarily maintained globally by the printing workflow system 2. As further discussed below, the printing workflow system 2 sends a description of a document processing job to each autonomous cell in the printing workflow system. Each cell responds to the printing workflow system with a bid to process the document processing job. Based on the bid, the printing workflow system decides which cell or cells will process this document processing job.

The second technique 47b for scheduling a document processing job is based on the optimization of the overall global arrangement of the cells in the printing workflow system 2. As further discussed below, several of the operating characteristics of each of the cells in the printing workflow system can be optimized. The optimization of the operating characteristics is based on finding the Pareto optimal solutions for scheduling the document processing job. Using this technique requires that operating characteristics of all the cells be maintained globally in the printing workflow system.

Figure 8:
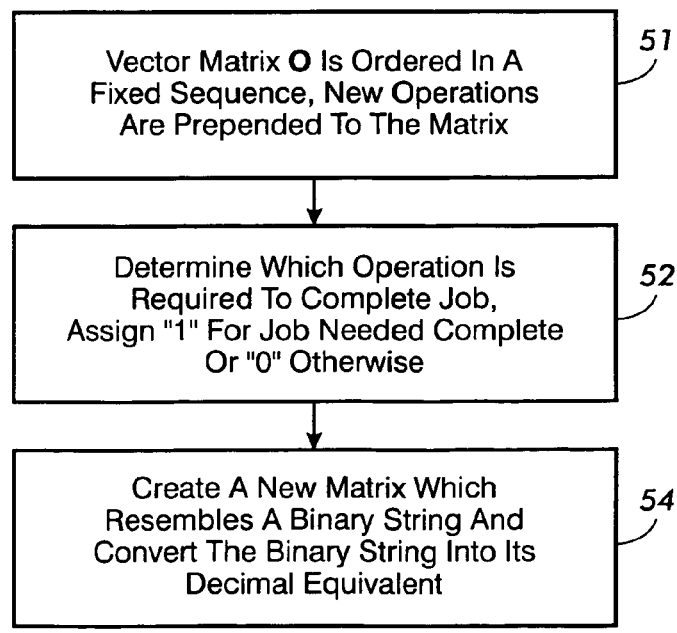
FIG. 8 is an illustration of an example of developing an unique ID

FIG. 8 illustrates an example of how the printing workflow system produces a unique ID. Each document processing job in a document factory requires a set of operations to be performed. To effectively manage different job types it is necessary to assign a unique ID to a job based on the operations that are needed to fully complete a job. Also, this unique ID may include information relevant for each particular operation. This ID can be used to determine to which cell the job needs to be routed in order to be completed, and to provide information to the stations inside the cell. It can also be used to perform analysis of an LDF that involve grouping jobs into sets that require same operations to complete.

In the present invention the following notation are presented:
n: Number of operations in the factory
O=[O1, . . . , On]: is a vector with n operations that can be performed by the printing workflow system. For example O1 could denote color printing, O2 could denote punching, and O3 could denote bind etc.

As demonstrated on step 51, the vector O is ordered in a fixed sequence. This sequence is fixed for a given printing workflow system. If the printing workflow system gets augmented with newer operations, then the new operations are prepended to the matrix, i.e. they are added to the beginning of the vector. For each document processing job, the operations required to complete the job are determined. For each operation that needs to be completed a numerical value of "1" is assigned for the job, and a numerical value of "0" is assigned if the operation is not needed, as shown in step 52. This will result in a new vector, which resembles a binary string. The binary string is converted to its decimal equivalent, as shown in step 54. That represents the unique ID for the document processing job.

Figure 9:
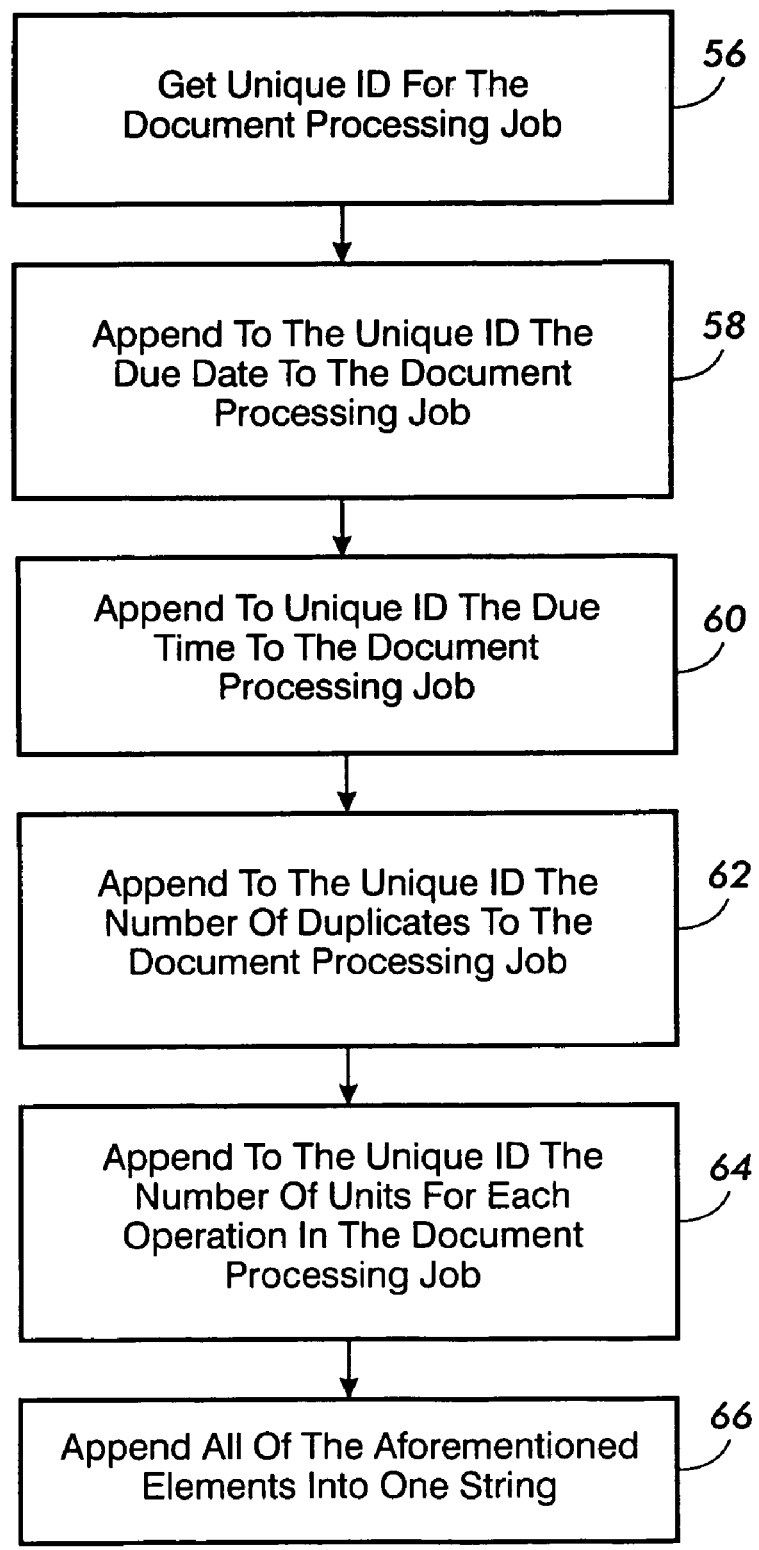
FIG. 9 is an illustration of an example of developing a descriptive ID.

FIG. 9 illustrates an example of developing a descriptive ID. The descriptive ID contains more information than the unique ID (as disclosed above). The descriptive ID contains explicit disclosure of the operations, due date, due time, number of duplicates, and number units of a document processing job. Thus, the descriptive ID gives a complete disclosure of the document processing job being processed. As show in FIG. 8, there are several steps needed to assign a descriptive ID to a document processing job.

For a given document processing job and a given integer number D the steps for assigning a descriptive ID are as follows. In step 56, the printing workflow system computes a unique ID (as disclosed in FIG. 7) for the document processing job. The unique ID is used as a basis to develop a descriptive ID for the document processing job. Step 58 discloses appending the due date to the unique ID using D-digit month-day format (e.g., 0623 for June 23 where D=4). The due time is appended to the unique ID in step 60 using a D-digit 24-hour format (e.g. 1525 for 3:25 PM where D=4. Steps 58 and 60 allow the printing workflow system 2 or a cell 4, 6 or 8 access to the due date and the due time of a job by looking at the descriptive ID of the document processing job without any exhaustive computation. The number of duplicates of the originals that are needed are appended to the unique ID using a D-digit format (step 62). If this value exceeds D-digits, the document processing job is partitioned into subjobs such that their number of duplicates fit into D-digits. Step 64 discloses appending the unique ID to the number of units (in the original) associated to the operation O1 only if this operation is required (e.g., if O1 denotes color printing and the original has 26 colors copies and D=4, append 0026). The last step is repeated for the next operation on the sequence O, and so on and so forth until all operations O are considered. Step 66 entails combining all of the aforementioned appended entities into a string. This results in a decimal string with (at least five) different D-digit fields. Conversion to hexadecimal can be used to save some digits; i.e., generate the descriptive ID in decimal, convert to hexadecimal for ID transmission, etc., and convert to back to decimal for ID interpretation.

It is worth noting that, depending on the use, the system may need to focus just on a few fields of the descriptive ID. For example, an algorithm for cell assignment may need to look only at the first three values (unique ID, due date, and due time) to decide which cell takes the job.

Figure 10:
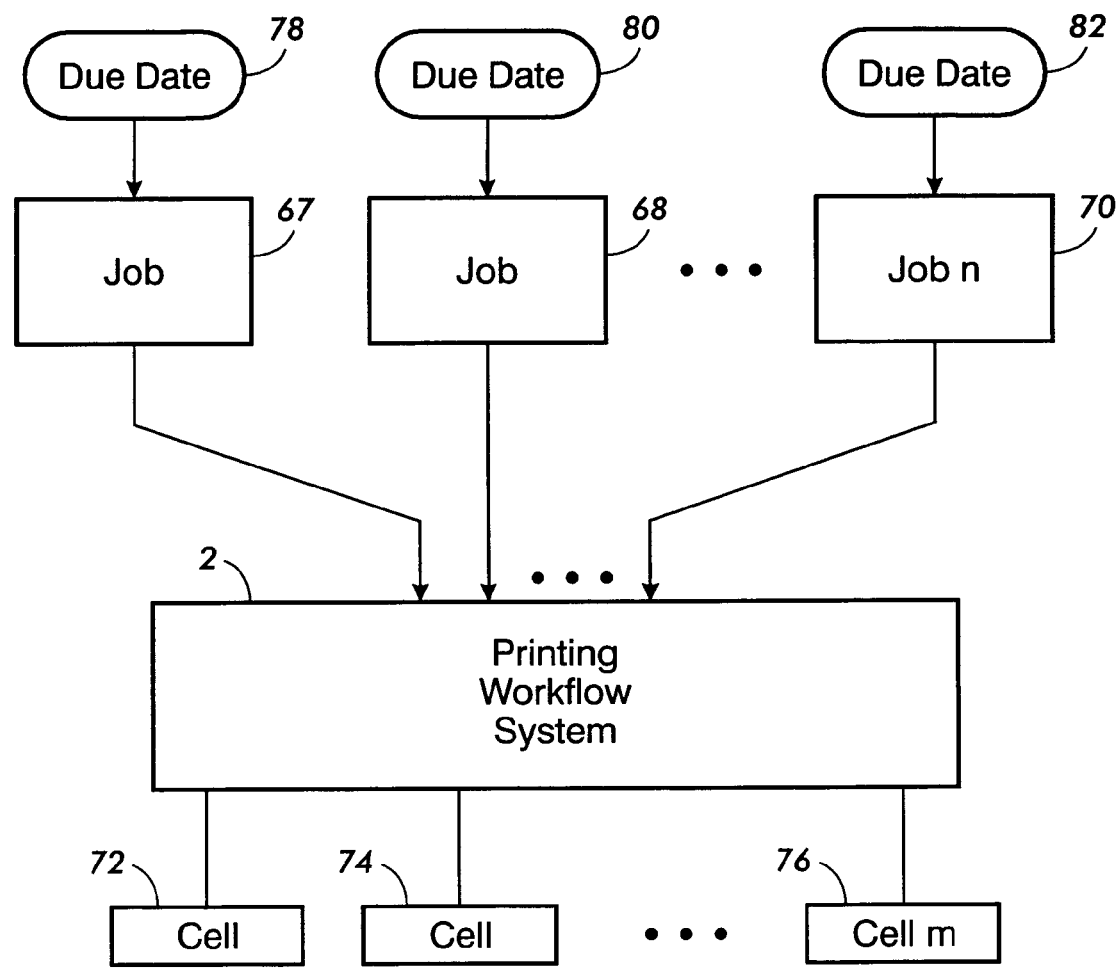
FIG. 10 is an illustration of an example of scheduling of document processing jobs in the printing workflow systems.

FIG. 10 illustrates an example of the second technique for scheduling of document processing jobs in the printing workflow systems. The printing workflow system is organized into a number of different manufacturing cells. These cells group different machines (for example, a cell includes two printers, a coil binder and a shrink wrapper) such that document jobs can be completed entirely in one cell. In this way, the costs and delays caused by inter-cell job movements are lowered. While only a particular cell may be able to manufacture some jobs, most of the jobs can be entirely manufactured by more than one cell. It is thus reasonable to use this "freedom" on the cell selection to schedule jobs in order to guarantee that they are finished by their due dates and that some additional objective is achieved as well, e.g., the time to finish all jobs is minimized.

The job-scheduling problem may be stated more precisely. Suppose that a LDF has m manufacturing cells, C1 (72), C2 (74), . . . , Cm (76), and n jobs, J1 (67), J2 (68), . . . , Jn (70), waiting to be processed. Each one of the jobs has a customer due date (the job has to be finished by this date). Decide what portions of each one of the njobs are to be assigned to each one of the m cells and in which order these job portions are to be queued in a given cell, such that all jobs are finished by their customer due dates 78, 80, 82 and some additional objective is achieved. Here, "to finish all jobs by their customer due dates" is the hard constraint. A candidate schedule not meeting this constraint is discarded; otherwise it is a feasible schedule. The "additional objective" is the soft goal; e.g., to make each cell's processing time as small as possible.

It usually requires a huge amount of computation to find global solutions to the problems stated before. The illustrative embodiment uses an algorithm to find a solution to this problem. The algorithm comprises two steps, and each step involves simple computations. This algorithm is the basis for the real-time control scheme given later in this IP.

We introduce some notation. For a given job i, there is an arrival date (the day the job order arrives at the LDF), a customer due date, and m estimated processing times $t_{ij}$, with j=1, . . . , m, defined by $t_{ij}$: estimated time for cell Cj to finish 100% of job Ji.

When $t_{ij}$=0, it means that the job i cannot be finished by the cell j. There are some underlying assumptions:
1. Any job can be done entirely by (at least) one of the cells
2. Any job can be partitioned into subjobs
3. Setup times can be neglected To solve the job-scheduling problem the following two-step solution method is applied:
1. Assign all portions of each one of the n jobs to the cells that can entirely manufacture the job (i.e., to all cells with tij>0, for a fixed i), such that the additional objective is optimized.
2. Order the (partial) jobs assigned to each one of the m cells using some standard heuristics.

Figure 11:
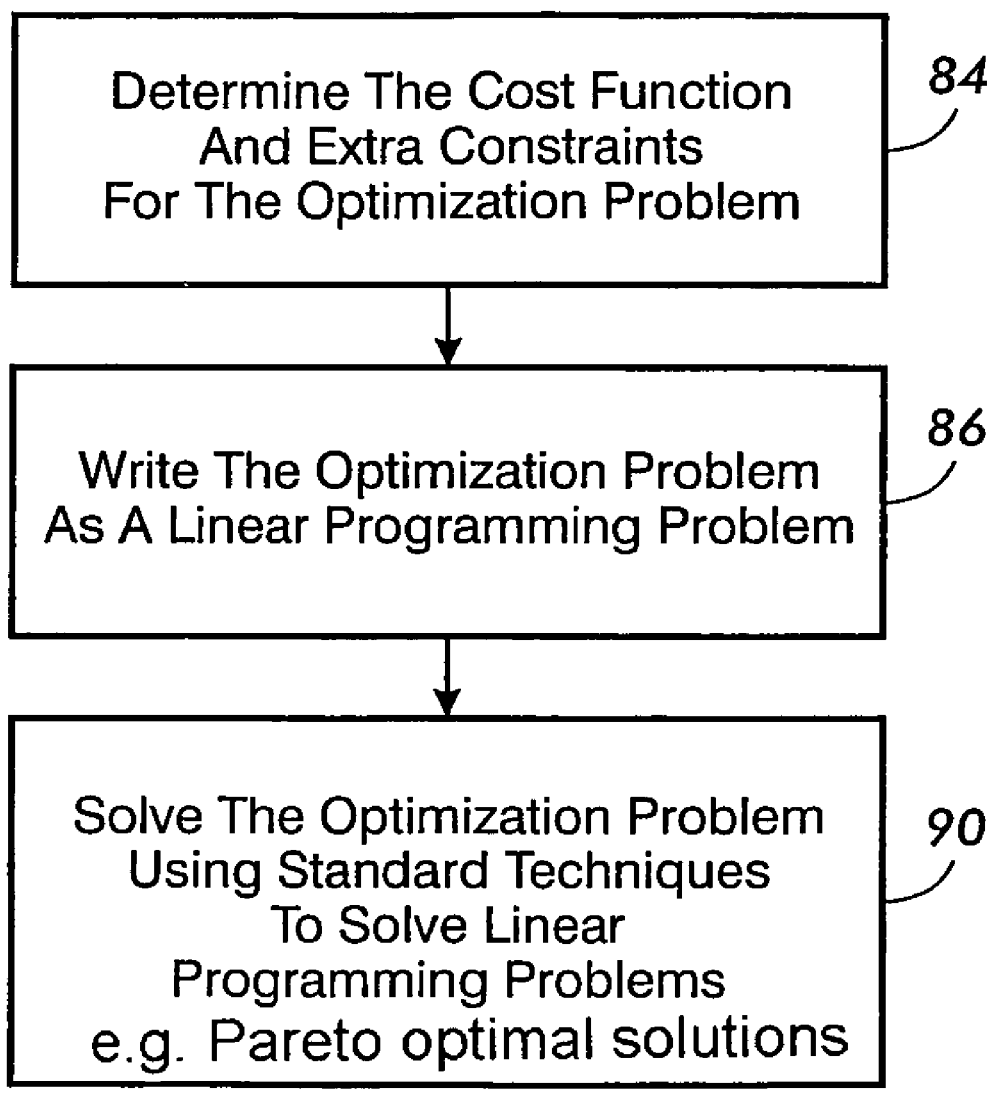
FIG. 11 is an illustration of the first step in the two step solution for scheduling document processing job

FIG. 11 illustrates the first step in the two step solution method for scheduling a document processing job. The problem in Step 1 can be written as follows. Let $x_{ij}$, where i=1,2, . . . , m, be defined by $x_{ij}$: portion of the job to be manufactured by cell Cj.

Then the optimization problem may be stated as follows:

minimize F($x11$, . . . , $xnm$)

subject to $xij \geq 0$, for $i=1, \ldots, n, j=1, \ldots, m$.

$$x11+x12+ \ldots +x1m=1, \ldots, xn1+xn2+ \ldots +xnm=1 \quad (1)$$

where the optimization variables are the xij's. The scalar-valued cost function F(x11, x12, . . . , xnm) represents the additional objective (the soft goal). The problem constraints reflect that all job portions should be non-negative (first line of constraints), and that all job portions should add up to 100% (second line of constraints). If job Jk cannot be entirely manufactured by cell Cp (i.e., tkp=0 in Table 1), we must add to the constraints in (1) the following $$xkp=0 \quad (2)$$

Also, constraints like $$xrq=0.5 \text{ or } xrq \geq 0.5 \quad (3)$$

may be added to equation (1) to impose that cell Cq takes care of exactly or at least 50% of job Jr. Thus, determining the cost functions and it constraints allows the steps needed as shown in step 84.

When the cost function F is linear in x11, x12, . . . , xnm, the optimization problem (1) (possibly with constraints of the type (2) and (3)) is a linear programming (LP) problem as shown in step 86. Therefore, it can be solved using very efficient numerical algorithms as shown in step 90. Determining the linear properties of cost functions can essentially aid in determining the proper techniques to find the optimal solutions to the optimization problem.

One practical class of cost functions giving LP problems is the following. Assume we want to make each cell processing time as small as possible. This is a multiobjective optimization problem. If we want to minimize the time a given cell Cj is busy, the cost in (1) is in this case given by $$F=Gj(x11, x12, \ldots, xnm):=x1j*t1j+x2j*t2j+ \ldots +xnj*tnj.$$

In general, the optimal solution of (1) (optimally plus (2)(3)), for, say, F=G1 will be different than for other cell, say, F=Gm. Moreover, in general, the costs conflict: One cell will be busy less time, only if another cell is busy more time. Assume that one can plot in the m-dimensional cost space G1, G2, . . . , Gm, the points corresponding to all x11, x12, . . . , xnm, that verify the constraints in (1). The regions in this m-dimensional space that cannot be attained by any x11, x12, . . . , xnm, are called unachievable regions. The points on the boundary between achievable and unachievable regions define the tradeoff surface, and correspond to the Pareto optimal solutions. Pareto solutions are worth computing because they give limits of achievable performance (given any Pareto solution one cannot find another solution improving one of the costs without degrading one of the others). The following minimax approach to solve multiobjective problems always produces Pareto solutions minimize max $\{L1*G1(x11, \ldots, xnm), \ldots, Lm*Gm(x11, \ldots, xnm)\}$ subject to $xij \geq 0$ $x11+x12+ \ldots +x1m=1$ $$xn1+xn2+\ldots+xnm=1$$

where Lj are nonnegative constants, for j=1, . . . ,m, to be selected to express our preferences among the costs. For example:

Take L1>>L2, . . . ,L1>>Lm, to emphasize the busy time of the first cell over the others.

Take L1=L2=. . . =Lm, to minimize the time necessary to finish all jobs.

Any Pareto optimal solutions can be computed by solving the minimax problem for some value of L1, . . . ,Lm. Notice that the minimax cost is non-linear, but we can rewrite the problem as a linear one by introducing a slack variable y as follows.

Minimize y

Subject to $$xij>=0$$

$$L1*G1(x11,\ldots,xnm)<y$$

.
.
.

$$Lm*Gm(x11,\ldots,xnm)<y$$

$$x11+x12+\ldots+x1m=1$$

.
.
.

$$xn1+xn2+\ldots+xnm=1$$

Now we have a linear programming problem in the variables x11,x12, . . . ,xnm and y.

Figure 12:
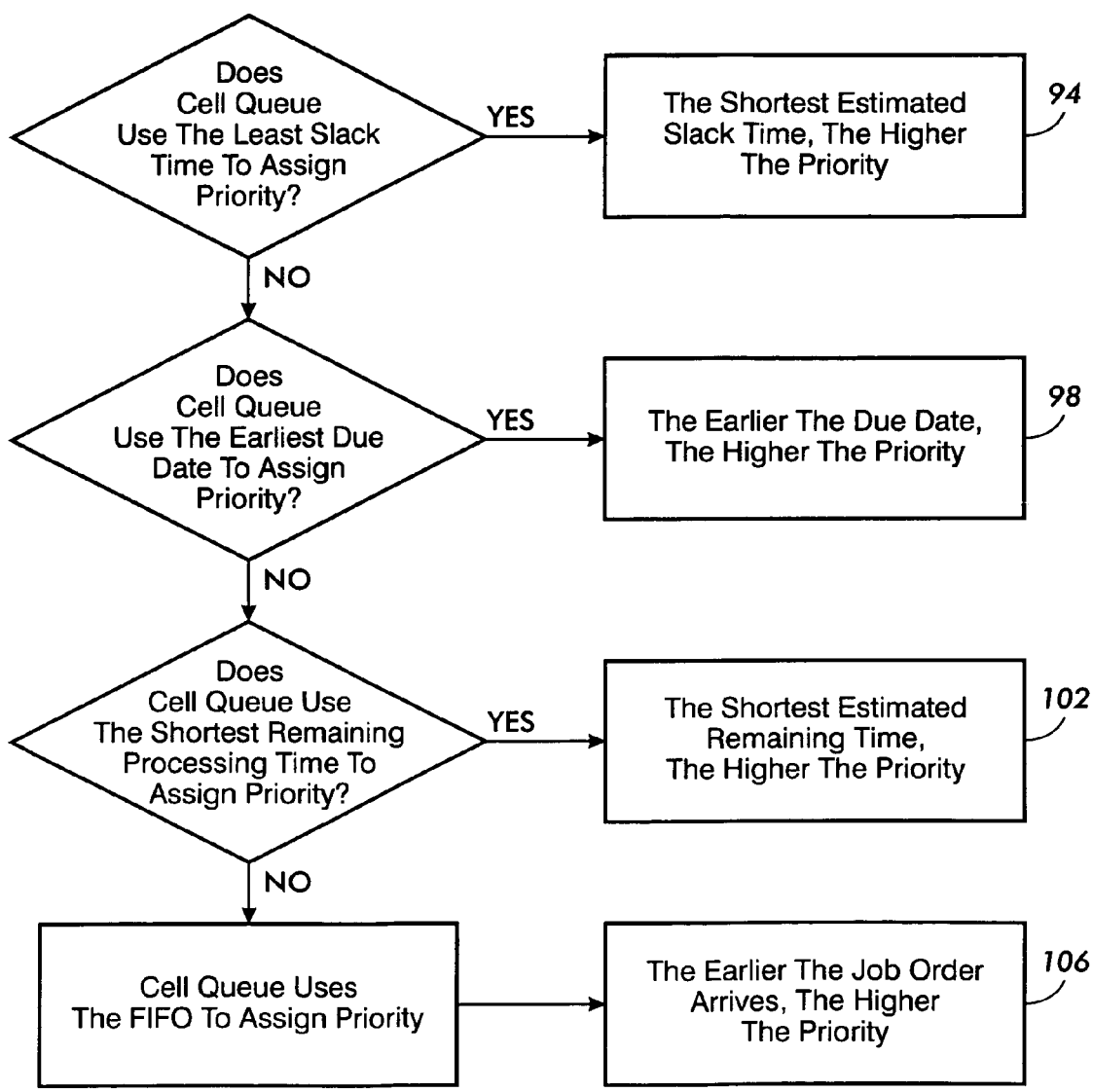
FIG. 12 is an illustration of the second step in the two step solution for scheduling document processing job.

FIG. 12 illustrates an example on how the second step in the two step solution method for scheduling a document processing job is performed. Step 2 of the scheduling method decides how to queue the (partial) jobs assigned to each cell for production. Basically, the priorities of the various jobs are given by the criteria used by the cell to queue document processing jobs. Step 94 demonstrates if a cell queue uses the "least slack time", (defined as "due date—estimated total time for processing"), to assign priority, then the cell queue will assign higher priority for to those with lower slack time. Step 98 demonstrates if a cell queue uses the earliest due date to assign priority, then the earliest the due date the higher the priority for the document processing job. Other cells may use the shortest remaining processing time to assign priority, then the shortest estimated remaining processing time the higher the job priority as shown in step 102. Some cells may use the FIFO approach to assigning priority such that jobs that arrive earlier get a higher priority as shown in step 106.

The discussion below focus on an alternative approach to routing and scheduling jobs within the printshop. In this scenario, the individual cells bid on jobs or subjobs based on the cell's current states. The printing workflow system evaluates the bids in real-time and sends jobs to different cells.

Figure 13:
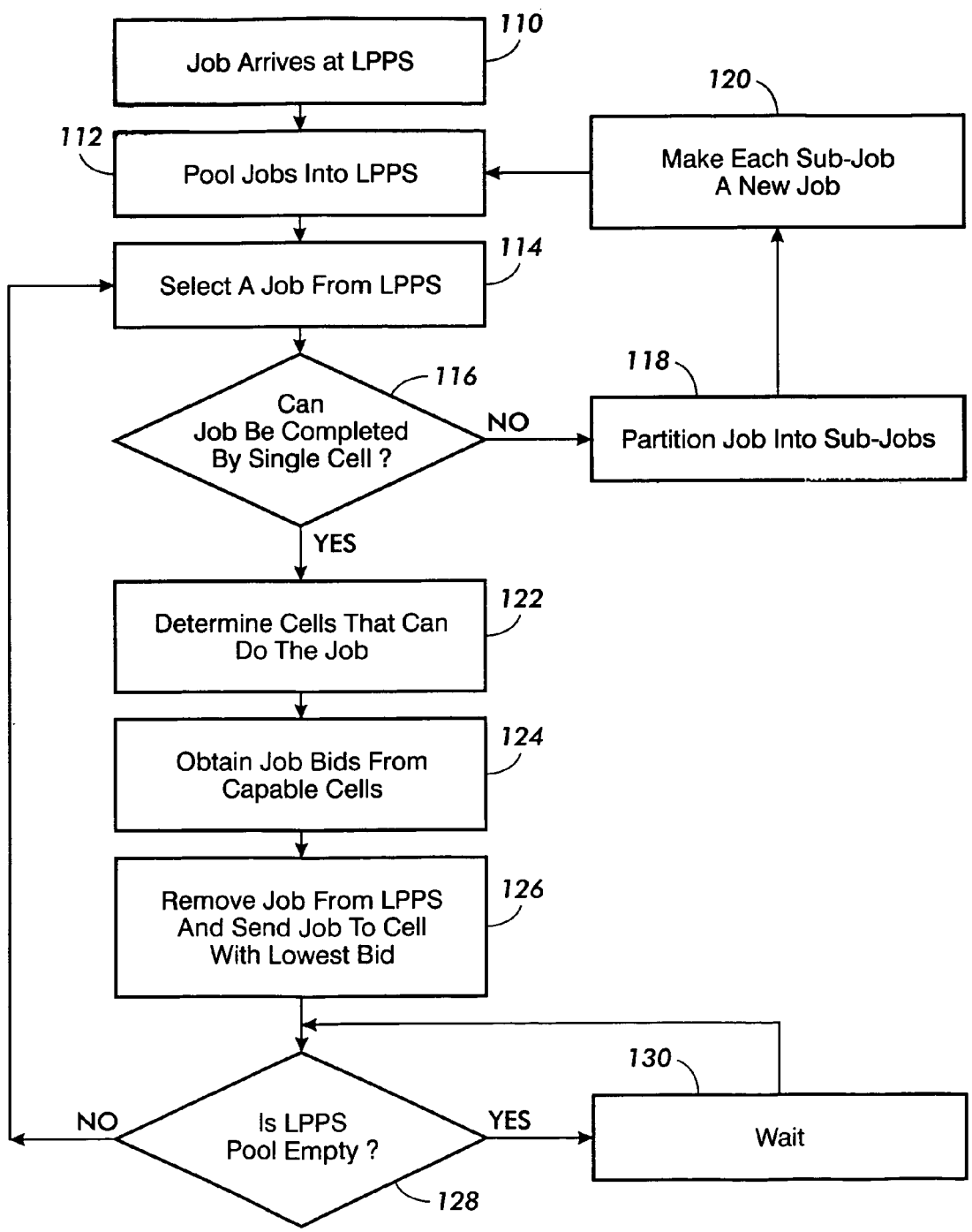
FIG. 13 is an illustration of bidding among cells.

FIG. 13 illustrates an example of bidding among cells in the document processing jobs in the printing workflow system. The printing workflow system consists of autonomous cells that can process most of the jobs all within themselves as they arrive in the shop. Each cell can autonomously manufacture a finite number of products. When document jobs arrive in the printing workflow system, it is crucial to manage the flow of these jobs through the different cells especially when a given job can be manufactured in more than one cell. Jobs arrive at the LPPS in step 110, and they are pooled into the LPPS in step 112. Select onejob from this pool in 114, and in 116 check if a single cell can complete the job. If the answer is "no", the job is partitioned in 118 into sub-jobs that can be finished in a single cell; and later in 120 each subjob is mapped into a new job and added to the server pool. If the answer is "yes", determine which cells can do the job in 122 and obtain job bids from these cells in 124. In step 126 we remove the job from the LPPS pool and send it to the cell issuing the lowest bid. In 128 we check if the LPPS pool is empty. If it is empty, we wait (130) for some period of time (say, 5 minutes) and check the LPPS pool again. If there are jobs in the pool, we go back to 114 and select a job from the LPPS pool.

The above algorithm can be implemented using a centralized control strategy or a distributed control strategy. In a centralized control strategy, a centralized controller keeps track of the various cost-functions depending on the current state of the cells and the jobs. In a decentralized control strategy, the cells keep track of their own cost-function autonomously and only provide the bidding cost and status updates on the jobs on the jobs when they are finished and exit the cells.

Figure 14:
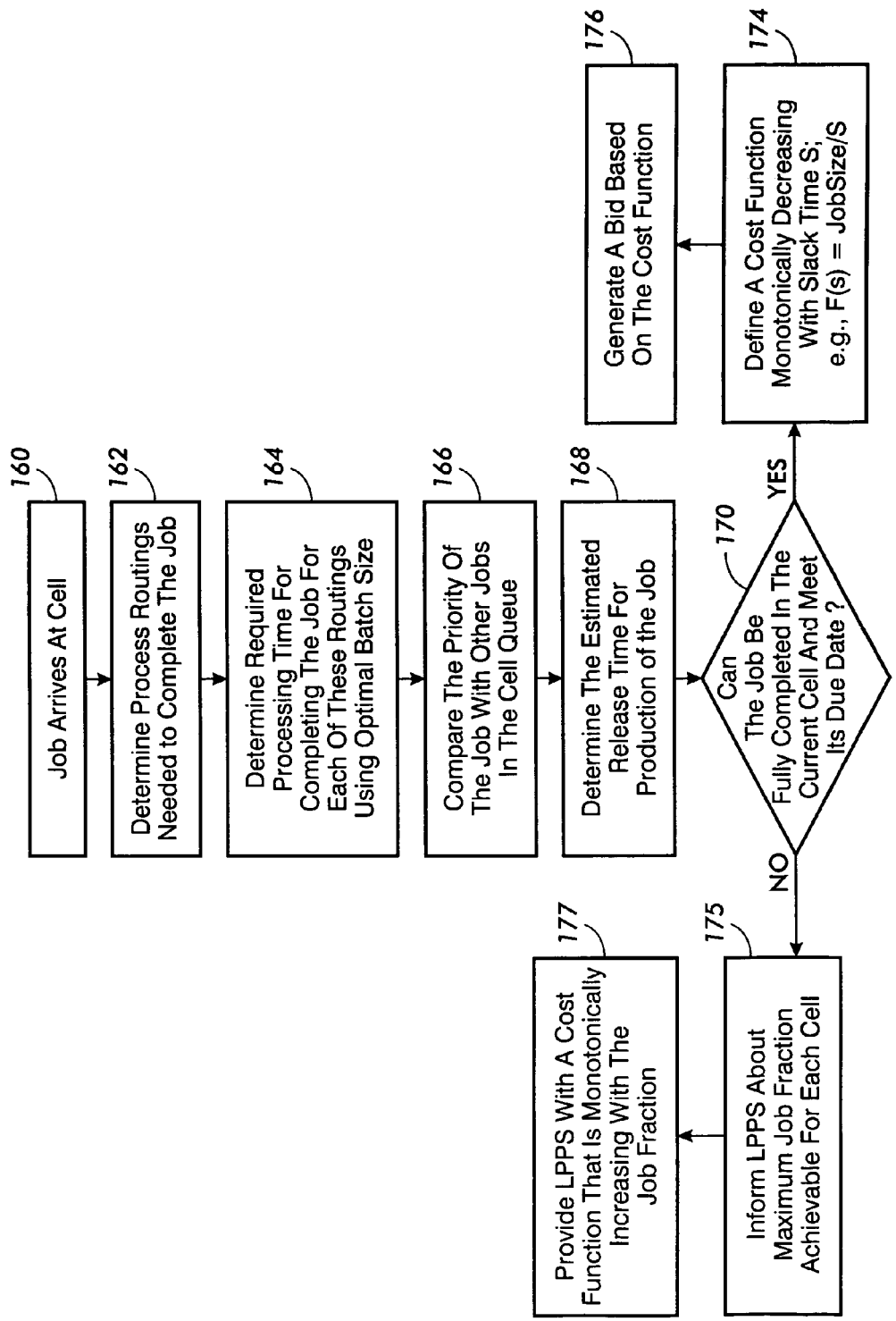
FIG. 14 is an illustration of how cells submit their bids.

FIG. 14 illustrates one example on how cells submit their bids to process a document job. Once cell 160 receives information from the printing workflow system regarding a document processing job it prepares to submit a bid to the printing workflow system by doing several step as shown in FIG. 14. When a job arrives to the cell (step 160) the process routings (i.e. the sequence of operations in the cell needed to fully execute the job) needed to complete the job are determined in step 162. The cell determines the required processing time for the complete document processing job for each of these routings using the optimal batch size as depicted in step 164. The optimal batch size is desired because it allows for the efficient processing of the document processing job. The cell sorts all the jobs by their priorities such that the one with the highest priority is the first one to be released for production. The cell determines the estimated release time for production of the job as depicted in step 168. Step 170 determines if the job can be fully completed in the current cell, determine the slack time S for the current job where the slack time is defines as (Due Date—Release Time—Estimated Production Time), and define a decreasing cost function as F(S)=JobSize/S as shown in step 174 to generate a bid (step 176). Otherwise, if the document processing job is large enough not to be completed fully by a cell, then the cell 160 will inform the LPPS about the maximum fraction of the job it can process (step 175 and also provide the LPPS with a monotonically increasing cost function of the job fraction (step 177). The LPPS will evaluate all the capable cells to see if the job can be fully completed in neither.

Figure 15:
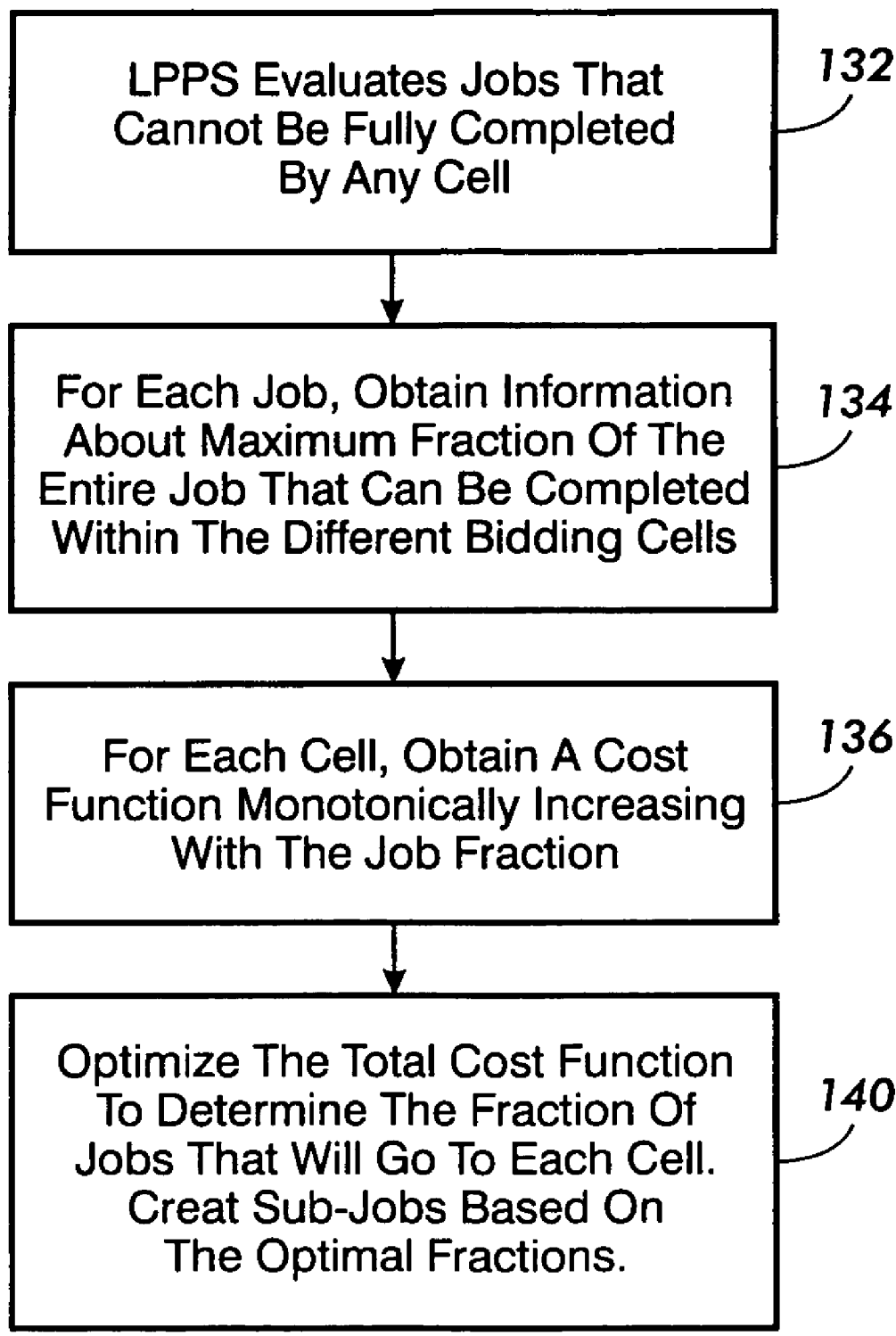
FIG. 15 is a flowchart of the steps needed to determine a bid for a document processing job.

FIG. 15 illustrates in a flowchart the steps needed to determine a bid for a document-processing job that is large enough not to be fully completed by any cell (step 132). The printing workflow system determines what fraction of the entire job can be completed within the different capable cells as shown in step 134. Let us assume that we have k cells that are capable of doing the job and are bidding for portions of the job and that each can perform a maximum of $\alpha j max$ where $\{1>=j>=k\}$ fraction of the job. Each cell provides a monotonically increasing cost function of a for this document-processing job denoted by $Cj(\alpha j)$ as shown in step 136. For example, for cell j the cost function could be $Cj(\alpha j)=7 \alpha j + 10$. The server optimizes the total cost function $$C(\alpha 1, \ldots, \alpha k) = \sum_{j=1}^{k} Cj(\alpha j)$$

with constraints ($\alpha j > \alpha j max$, $\alpha 1 + \alpha 2 + \ldots + \alpha k = 1$) to determine the fraction of jobs that will go to each cell. The cost functions provided by the cells can be different for each cell. The server then creates sub jobs based on the optimal fractions and routes them to appropriate cells (step 140).

Numerous modifications and alternative embodiments of the invention will be apparent to those skilled in the art in view of the foregoing description. Accordingly, this description illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A printing workflow system disposed in a network for coordinating production of a document processing job among a plurality of autonomous cells, the printing workflow system comprising:
    a search module for searching which one or more of the autonomous cells can execute the job and creating a subset of one or more autonomous cells available to process the document processing job, wherein each autonomous cell consists of a logical grouping of resources, representing physical devices, sufficient for completing at least one type of document processing job;
    a transfer module for transferring information to the subset of autonomous cells about the document processing job;
    a bidding module including,
        a process routings module for determining process routings needed to complete the document processing job,
        a required processing time module for determining required processing time for completing the job for each of said routings, using optimal batch sizes,
        a comparing module for comparing priority of the job with other jobs in a cell queue of at least one autonomous cell,
        an estimation module for determining estimated release time for production of the job,
        a cost function module for defining a cost function monotonically decreasing with a slack time when it is determined the job can be fully completed in the current autonomous cell by its due date,
        a bid generating module for generating a bid based on the defined cost function,
        an informing module for informing a system server of a maximum job fraction achievable for the autonomous cell when it is determined the job cannot be fully completed in the current autonomous cell, by its due date, and
        a providing module for providing the system server with a cost function that monotonically increases with the job fraction which can be completed;
    a receiving module for receiving bids from the bidding module in response to the information transferred to the first subset of autonomous cells to process the document processing job;
    a selector module for selecting one or more autonomous cells to process the document processing job based on information in the bids received; and
    a queuing module for dispatching the document processing job to the selected one or more autonomous cells for processing.

2. The printing workflow system as recited in claim 1 wherein the printing workflow system stores all information regarding currently pending document processing jobs in each of said autonomous cell.

3. The printing workflow system as recited in claim 1 wherein the printing workflow system stores all information regarding current document processing jobs that have arrived in a print shop and have yet to be allocated for production.

4. The printing workflow system as recited in claim 1 wherein the selector module selects one or more of the autonomous cells of the subset of autonomous cells with the lowest bids.

5. The system of claim 1 wherein the autonomous cells include at least a sub-group consisting of a printer, a binder, a copier and, a collator as the physical devices.

6. In a printing workflow system a method for processing document processing jobs by receiving bids generated by a plurality of autonomous cells to process the document processing job, the method comprising:
    searching which one or more of the autonomous cells can execute the job and creating a first subset of autonomous cells available to process the document processing job;
    transferring information to the first subset of autonomous cells about the document processing job;
    determining process routings needed to complete the job;
    determining required processing time for completing the job for each of said routings, using optimal batch sizes;
    comparing priority of the job with other jobs in a cell queue of at least one autonomous cell;
    determining estimated release time for production of the job;
    defining a cost function monotonically decreasing with a slack time when it is determined the job can be fully completed in the current autonomous cell by its due date;
    generating a bid based on the defined cost function;
    informing a system server of a maximum job fraction achievable for the autonomous cell when it is determined the job cannot be fully completed in the current autonomous cell, by its due date;
    providing the system server with a cost function that monotonically increases with the job fraction which can be completed;

receiving the bids in response to the information transferred to the subset of autonomous cells to process the document processing job; and selecting one or more of the autonomous cells of the subset of autonomous cells to process the document processing job based on information in the bids received.

7. The method as recited in claim 6 wherein the printing workflow system stores all information regarding currently pending document processing jobs in each autonomous cell.

8. The method as recited in claim 7 wherein the printing workflow system stores all information regarding current document processing jobs that have arrived in a print shop and have yet to be allocated for production.

9. The method as recited in claim 8 wherein the printing workflow system stores all information regarding the currently pending document processing jobs in each autonomous cell.

10. The method as recited in claim 6 wherein the selector module selects one or more of the autonomous cells of the subset of autonomous cells with the lowest bids.

11. The system of claim 6, wherein the autonomous cells include at least a sub-group consisting of a printer, a binder, a copier and, a collator, as the physical devices.

12. A scheduling device in a printing workflow system for scheduling a document processing job among a plurality of autonomous cells, the scheduling device comprising:
    a first module for determining whether the document processing job can be accomplished in one autonomous cell or a plurality of autonomous cells, wherein each autonomous cell consists of a logical grouping of resources, representing physical devices, sufficient for completing at least one type of document processing job;
    a second module for determining the time it would take to process the document processing job in the first module;
    a third module for defining timing parameters of one or more autonomous cells, to accomplish the document processing job based on information from the second module;
    a fourth module for applying the timing parameters to the autonomous cell or plurality of autonomous cells to process the document processing job by a specific due date; and
    a fifth module for queuing the document processing job in one or more autonomous cells based on the information from the fourth module to efficiently process the document processing job in by the specified due date, wherein the first, second, third and fourth modules further include sub-portions of a bidding module used to generate a bid by at least one of the autonomous cells, including,
        a process routings module for determining process routings needed to complete the job,
        a required processing time module for determining required processing time for completing the job for each of said routings, using optimal batch sizes,
        a comparing module for comparing priority of the job with other jobs in a cell queue of at least one autonomous cell,
        an estimation module for determining estimated release time for production of the job,
        a cost function module for defining a cost function monotonically decreasing with a slack time when it is determined the job can be fully completed in the current autonomous cell by its due date,
        a bid generating module for generating a bid based on the defined cost function,
        an informing module for informing a system server of a maximum job fraction achievable for the autonomous cell when it is determined the job cannot be fully completed in the current autonomous cell, by its due date, and
        a providing module for providing the system server with a cost function that monotonically increases with the job fraction which can be completed.

13. The scheduling device as recited in claim 12 wherein the printing workflow system stores all information regarding the currently pending document processing jobs by each autonomous cell.

14. The scheduling device as recited in claim 12 wherein the printing workflow system stores all information regarding current document jobs that have arrived in a print shop and have yet to be allocated for production.

15. The scheduling device as recited in claim 14 wherein the printing workflow system stores all information regarding the currently pending document processing jobs by each autonomous cell.

16. The device of claim 12, wherein the autonomous cells include at least a sub-group consisting of a printer, a binder, a copier and, a collator, as the physical devices.

17. In a scheduling device in a printing workflow system, a method for scheduling a document processing job, the method comprising:
    determining, by a first module, whether the document processing job could be accomplished in one autonomous cell or a plurality of autonomous cells, wherein each autonomous cell consists of a logical grouping of resources, representing physical devices, sufficient for completing at least one type of document processing job;
    determining, by a second module, the time it would take to process the document processing job in the first module;
    defining, by a third module, timing parameters of one or more autonomous cells, to accomplish the document processing job based on the information from the second module;
    applying, by a fourth module, the timing parameters to the autonomous cell or plurality of autonomous cells to process the document processing job by a specified due date; and
    queuing, by a fifth module, the document processing job in one or more autonomous cells based on the information from the fourth module to efficiently process the document processing job by the specified due date, wherein prior to queuing, further providing a bidding process including,
        determining process routings needed to complete the job,
        determining required processing time for completing the job for each of said routings, using optimal batch sizes,
        comparing priority of the job with other jobs in a cell queue of at least one autonomous cell,
        determining estimated release time for production of the job,
        defining a cost function monotonically decreasing with a slack time when it is determined the job can be fully completed in the current autonomous cell by its due date,
        generating a bid based on the defined cost function, informing a system server of a maximum job fraction achievable for the autonomous cell when it is determined the job cannot be fully completed in the current autonomous cell, by its due date, and providing the system server with a cost function that monotonically increases with the job fraction which can be completed.

18. The method as recited in claim 17 wherein the printing workflow system stores all information regarding currently pending document processing jobs in each autonomous cell.

19. The method as recited in claim 17 wherein the printing workflow system stores all information regarding current document processing jobs that have arrived in a print shop and have yet to be allocated for production.

20. The method as recited in claim 19 wherein the printing workflow system stores all information regarding the currently pending document processing jobs in each autonomous cell.

21. The method of claim 17, wherein the autonomous cells include at least a sub-group consisting of a printer, a binder, a copier and, a collator, as the physical devices.

22. A printing workflow system disposed in a network for coordinating production of a document processing job among a plurality of autonomous cells, the printing workflow system comprising:

a search module for searching which one or more of the autonomous cells can execute the job and creating a subset of autonomous cells available to process the document processing job, wherein each autonomous cell consists of a logical grouping of resources, of representing physical devices, sufficient for completing at least one type of document processing job;

a scheduling device for splitting document processing jobs that cannot be entirely processed in a single autonomous cell into sub-jobs capable of being entirely processed in a single autonomous cell;

a transfer module for transferring information to the subset of autonomous cells about the document processing job;

a bidding module including, a process routings module for determining process routings needed to complete the document processing job, a required processing time module for determining required processing time for completing the job for each of said routings, using optimal batch sizes, a comparing module for comparing priority of the job with other jobs in a cell gueue of at least one autonomous cell, an estimation module for determining estimated release time for production of the job, a cost function module for defining a cost function monotonically decreasing with a slack time when it is determined the job can be fully completed in the current autonomous cell by its due date, a bid generating module for generating a bid based on the defined cost function, an informing module for informing a system server of a maximum job fraction achievable for the autonomous cell when it is determined the job cannot be fully completed in the current autonomous cell, by its due date, and a providing module for providing the system server with a cost function that monotonically increases with the job fraction which can be completed;

a receiving module for receiving bids from the subset of autonomous cells in response to the information transferred to the subset of autonomous cells to process the document processing job;

a selector module for selecting one or more autonomous cells to process the document processing job based on information in the bids received; and a queuing module for dispatching the document processing job to the selected one or more autonomous cells for processing.

23. The printing workflow system as recited in claim 22 wherein the scheduling device assigns the sub-jobs as independent document processing jobs.

24. The system of claim 22, wherein the autonomous cells include at least a sub-group consisting of a printer, a binder, a copier and, a collator, as the physical devices.

* * * * *